United States Patent
Tsutsumi et al.

(10) Patent No.: US 6,904,277 B2
(45) Date of Patent: Jun. 7, 2005

(54) TELEPHONE SYSTEM

(75) Inventors: Takayuki Tsutsumi, Kawasaki (JP); Yoshikazu Kobayashi, Kawasaki (JP)

(73) Assignee: NEC Infrontia Corporation (JP)

( * ) Notice: Subject to any disclaimer, the term of this patent is extended or adjusted under 35 U.S.C. 154(b) by 380 days.

(21) Appl. No.: 10/259,754

(22) Filed: Sep. 30, 2002

(65) Prior Publication Data

US 2004/0023641 A1 Feb. 5, 2004

(30) Foreign Application Priority Data

Mar. 22, 2002 (JP) ........................ 2002-081689

(51) Int. Cl.[7] .............................. H04M 1/68; H04M 3/16
(52) U.S. Cl. .................... 455/411; 455/414.1; 455/555; 455/422.1; 370/338; 370/331
(58) Field of Search ............................ 455/411, 555, 455/414.1, 422.1, 550.1, 41.2, 507; 370/338, 331; 380/247, 250

(56) References Cited

U.S. PATENT DOCUMENTS

| 5,222,123 | A | | 6/1993 | Patsiokas et al. | |
| 6,418,130 | B1 | * | 7/2002 | Cheng et al. | 370/331 |
| 2002/0141369 | A1 | * | 10/2002 | Perras | 370/338 |
| 2003/0039234 | A1 | * | 2/2003 | Sharma et al. | 370/338 |
| 2003/0119557 | A1 | * | 6/2003 | Lundby | 455/561 |
| 2003/0128682 | A1 | * | 7/2003 | Parry | 370/338 |
| 2003/0169713 | A1 | * | 9/2003 | Luo | 370/338 |

FOREIGN PATENT DOCUMENTS

| EP | 1 011 278 | 6/2000 |
| JP | 2001-8266 | 1/2001 |

* cited by examiner

*Primary Examiner*—Sonny Trinh
*Assistant Examiner*—Khai Nguyen
(74) *Attorney, Agent, or Firm*—Dickstein, Shapiro, Morin & Oshinsky, LLP.

(57) ABSTRACT

An object of the present invention is to control incoming data to be received by an appropriate communication destination by using a main device to monitor a traffic state of a wireless LAN and a user login state. A main device (1) for performing call control call control of wireless telephone (8, 8) determines a transmission destination (transfer destination) of a call received from, for example, a traffic state of the wireless-LAN base station (2, 3) or a login state of the wireless telephone, and transmits data to, for example, a public network (6), a local-area network, or an IP telephone network. In addition, the main device (1) preliminarily transmits data-reception notifying mail to a reception destination to enable a user to select a data-receiving method.

9 Claims, 12 Drawing Sheets

103 LOGIN TABLE

| USER NAME | IP ADDRESS | MAC ADDRESS | SSID |
|---|---|---|---|
| Tsutsumi | XXX.XXXXXX.010 | XX-XX-XX-XX-XX-10 | 100 |
| Takayuki | XXX.XXXXXX.020 | XX-XX-XX-XX-XX-11 | 101 |
| ... | ... | ... | ... |

Columns: 103-1, 103-2, 103-3, 103-4

FIG. 9

101 USER INFORMATION TABLE

| USER NAME | EXT.NO. | NAME | 1ST TEL.NO. FOR TRANSFER | 2ND TEL.NO. FOR TRANSFER |
|---|---|---|---|---|
| Tsutsumi | 100 | (TSUTSUMI) 堤 | 03-XXX-XXX1 | 090-XXX-XXX1 |
| Takayuki | 101 | (Takayuki) 貴之 | 044-XXX-XXX1 | 070-XXX-XXX1 |
| ... | | ... | ... | ... |

Columns: 101-1, 101-2, 101-3, 101-4, 101-5

FIG. 10

102 TRAFFIC TABLE (MAIN DEVICE)

| SSID | WIRELESS CHANNEL | NO. OF CONNECTED WIRELESS T | NO. OF TRANSMISSION PACKETS (packet/s) | NO. OF RECEPTION PACKETS (packet/s) |
|---|---|---|---|---|
| 102-1 | 102-2 | 102-3 | 102-4 | 102-5 |
| 100 | 1 | 1 | XXX | YYY |
| 101 | 9 | 8 | XXXX | YYYY |
| ... | ... | ... | ... | ... |

FIG. 11

203 TRAFFIC TABLE (MAIN TABLE)

| SSID | WIRELESS CHANNEL | NO. OF CONNECTED WIRELESS T | NO. OF TRANSMISSION PACKETS (packet/s) | NO. OF RECEPTION PACKETS (packet/s) |
|---|---|---|---|---|
| 203-1 | 203-2 | 203-3 | 203-4 | 203-5 |
| 100 | 1 | 1 | XXX | YYY |

FIG. 12

USER A

FIG. 15A

|  | MONDAY | TUESDAY | WEDNES-DAY | THURS-DAY | FRIDAY |
|---|---|---|---|---|---|
| MORNING | PATTERN A | PATTERN A | PATTERN A | PATTERN C | PATTERN A |
| AFTERNOON | PATTERN B | PATTERN B | PATTERN B | PATTERN A | PATTERN B |
| AFTER REGULAR TIME | PATTERN D | PATTERN D | PATTERN D | PATTERN D | — |

|  | MONDAY | TUESDAY | WEDNESDAY | THURSDAY | FRIDAY |
|---|---|---|---|---|---|
| MORNING | EXTENSION NUMBER 111 | EXTENSION NUMBER 111 | 090-XXX-XXXX | 03-XXX-XXXX | EXTENSION NUMBER 111 |
| AFTERNOON | 03-XXX-XXXX | 03-XXX-XXXX | EXTENSION NO. 111 | 03-XXX-XXXX | EXTENSION NO. 111 |
| AFTER REGULAR TIME | 044-XXX-XXXX | 044-XXX-XXXX | 044-XXX-XXXX | 044-XXX-XXXX | — |

104

TELEPHONE SYSTEM

BACKGROUND OF THE INVENTION

The present invention relates to a telephone system using a wireless LAN. Specifically, it relates to number roaming control.

In a computer network, computers are mutually connected via a network. The Internet is known as a computer network via which computers of different types are mutually connected. The Internet uses a TCP/IP (transmission control protocol/internet protocol) as a network protocol. The TCP/IP is a hierarchical protocol formed of five layers. The IP is used as a typical protocol for a network layer, and the TCP is used as a typical protocol for a transport layer. For this reason, the name "TCP/IP" is widely used.

The IP includes a function of allocating addresses to individual computers connected to the Internet and a function of connecting a channel thereto. For the addresses, the IP uses IP addresses each represented by a 32-bit integer. Each of the IP addresses is allocated to a network interface of each of the computers; that is, the IP address is not allocated to the computer. As such, for a computer such as a router including a plurality of network interfaces, a unique IP address is allocated to each of the interfaces.

A LAN (local area network) is a locally facilitated network system for connecting a variety of computers, such as servers, workstations, and personal computers, distributed in a relatively narrow area, such as a same building or a same site. Widely used operating configurations include a configuration in which many hosts share one transmission medium. As a transmission control technique, MAC (media access control) is known. The MAC refers to access control that allows a plurality of nodes to smoothly use a local-area cable. The MAC is positioned over a datalink lower sublayer of an OSI (open systems interconnection) model, and implements a datalink layer function by operating in cooperation with an LLC (logic link control).

MAC addresses are standardized datalink layer addresses necessary for all ports or devices connected to the LAN. Another device in the network uses these addresses, thereby locates a specific port in the network, and generates and updates routing table and a data structure. The MAC address has a 6-byte length, and is controlled according to IEEE. The MAC address is also known as a hardware address, a MAC layer address, or a physical address.

An ARP (address resolution protocol) converts an IP address into a MAC address of, for example, Ethernet (registered trademark). When data is accessed for transmission from the IP layer, a destination IP address needs to be converted into a MAC address.

In a telephone service using the IP, particularly in an IP telephone service using a wireless LAN, audio quality varies depending on the traffic condition in the network. The "wireless LAN" refers to a LAN using transmission channels, such as an electromagnetic waves (radio waves) and light (infrared ray). A LAN using cable transmission channels is called a "wired LAN".

The "IP telephone" refers to a telephone using the IP. Specifically, the IP telephone includes a means for performing communication via an IP telephone network (IP network). Unlike an ordinary telephone, the IP telephone digitizes (packetize) sounds for transmission. The "IP telephone network" refers to an IP-used telephone network that enables IP-based communication, although the network is not specifically limited to the telephone network. An IP address (equivalent to a telephone number of an ordinary telephone) of a communication destination is entered to perform transmission to a communication destination by using the IP telephone. When a main device of an IP telephone is usable, the IP address can be correlated to either an extension number or a nickname (such as an arbitrary character string), so that transmission can be performed using the extension number or the nickname. The "IP communication" refers to communication being carried out through an IP telephone.

A telephone system using a wireless LAN is known. The telephone system includes a main device, a plurality of wireless-LAN base stations connected to the main device via a wired LAN, and a plurality of wireless telephones that communicate with the wireless LAN base stations via the wireless LAN. The main device is connected to a network such as a public network or the Internet. In this case, an SSID (service set ID) is set as a wireless-LAN base station zone identifier. The SSID is represented by an arbitrary character string of 32 or fewer characters.

In the conventional telephone system configured as described above, the main device performs transmits data to a destination regardless of the network condition. As such, the system can enter a busy state depending on the traffic condition, thereby disabling incoming data to be received.

Known prior-art publications related to the present invention includes Japanese Unexamined Patent Publication No. 2001-8266 (which hereinbelow will be referred to as a "prior-art publication 1"). The prior-art publication 1 discloses the provision of an "automatic answering telephone system" for implementing a compromise at a low cost between the provision of a cheap automatic-answering-telephone function service to users and the improvement in efficiency of the amount of transmission. According to the automatic-answering-telephone system disclosed in the prior-art publication 1, internet-automatic-answering-telephone transfer function devices and a portable-telephone position storage device are connected to exchangers that operate for portable telephones. The internet automatic-answering-telephone transfer function devices are connected to the Internet. The portable-telephone position storage device stores information of a registration position of each of the portable telephones, automatic-answering-function setting information therefor, and information of connection to the Internet automatic-answering-telephone transfer function devices. When automatic-answer information has been received from one of the portable telephones, the information is stored into the internet-automatic-answering-telephone transfer function device connected to the exchanger under which the portable telephone is controlled. In the case of performing a playback of an automatic-answering-telephone message, a request packet requesting retrieval of the automatic-answer information is transmitted from one of the internet-automatic-answering-telephone transfer function devices positioned close to the portable phone that has issued a playback request to all the internet-automatic-answering-telephone transfer function devices in a broadcast mode via the Internet, and is thereby collected.

SUMMARY OF THE INVENTION

To solve the problems described above, an object of the present invention is to provide a telephone system that uses a main device to monitor wireless-LAN traffic states and user-login states to thereby enable an appropriate communication destination to receive incoming data.

Another object of the present invention is to provide a telephone system capable of notifying a user of data reception prior to the data reception to provide the user with reception-node selection rights.

The prior-art publication 1 described above is not more than disclosing the automatic answering telephone system for registration and playback of automatic-answer information. The disclosed system is completely different from the object of the present invention that takes, for example, a wireless-LAN traffic state, into account to thereby enable an appropriate communication destination to receive incoming data.

To achieve the objects described above, the present invention employs technical configurations described hereunder.

A telephone system of the present invention includes wireless telephones, a plurality of wireless-LAN base stations connected to the wireless telephones via a wireless LAN, and a main device that is connected to the plurality of wireless-LAN base stations and that performs call control of the wireless telephones. In the telephone system, the wireless telephone includes storing means for storing a predetermined user name and input means for inputting a user name in units of an operation of login when performing an operation of login into the main device; and means for performing login notification of an IP address, a MAC address, one of a user name stored in the storing means and a user name input from the input means, and an SSID of wireless-LAN base station connected to the wireless telephone. Preferably, the main device includes a login table for storing login information notified by the wireless telephone in units of a user name; a user information table for storing an extension number and a nickname of a user that are preregistered in units a user name; and means that performs a comparison of information in the user information table and notifies the wireless telephone of the extension number and the nickname when a user name in the user information table matches a user name sent in the login notification, and that stores the login information notified by the wireless telephone.

In the telephone system, the main device preferably includes means for performing connection verification notification to the logged-in wireless telephone at a predetermined time interval; means for recording a login state into the login table; means for inputting connection completion to the login table upon receipt of an ACK from the wireless telephone; and means for inputting an unlogged-in state into the login table when an ACK is not received in a predetermined time.

In the telephone system, the wireless-LAN base station preferably includes means for transmitting traffic information containing information of SSIDs, wireless channels, an amount of transmission/reception, and the number of wireless telephone terminals connected to the wireless-LAN base station in a local network to the main device at a predetermined time interval. The main device preferably includes means for monitoring a traffic table to which the received traffic information is written in units of the wireless-LAN base station, at a predetermined time interval. The main device having received the login notification preferably includes means for referencing the traffic information in the traffic table that corresponds to an SSID contained in the login notification, and means for notifying the wireless telephone of login nonpermission due to a base station overload when the referenced traffic information has exceeded a predetermined traffic value. Preferably, the wireless telephone includes means that roams into a neighboring one of the wireless-LAN base stations according to a procedure regulated by IEEE 802.11f in response to the login nonpermission and that performing a login operation again.

In the telephone system, preferably, the main device further includes means that references the user information table in response to transmission performed by the wireless telephone by using a nickname and that detects a user name corresponding to the nickname; means that retrieves the detected user name from the login table and that obtains a transmission-destination IP address; and means for preventing the wireless-LAN base station from logging into a predetermined account contained in SSID information in the user information table.

In the telephone system, preferably, the main device further includes means for monitoring a traffic table to which received traffic information is written in units of the wireless-LAN base station, at a predetermined time interval; means for performing overload notification to a wireless telephone connected to an overloaded one of the wireless-LAN base stations when the received traffic information has exceeded a predetermined traffic value; means for requesting a modification of an audio codec used in communication.

In the telephone system, preferably, the main device further includes means for dialing into a public network, means for providing a gateway function for an IP-network communication and the public network, means for dialing into a local-area analog network and a local-area PHS network in addition to the public network, means for referencing the user information table when an unlogged-in wireless telephone has received data, and means for transmitting the received data to a telephone number of a predetermined transfer-destination public telephone network.

In the telephone system, preferably, the main device further includes means for referencing traffic information in a traffic table of the wireless-LAN base station into which a reception-destination wireless telephone is registered; and means that references the user information table and that transmits the received data to a local-area wireless telephone in a predetermined transfer-destination local network when the referenced traffic information has exceeded a predetermined amount of transmission/reception and a predetermined number of terminals.

In the telephone system, the main device further includes means for holding a call in a pending state for a predetermined time and means for recording an e-mail address into the user information table when an unlogged-in wireless telephone has received data; means for transmitting e-mail having predetermined contents; means for referencing the user information table and performing notification to perform prompting for data reception and a login operation; and means for releasing the pending state to enable communication when one of the wireless telephones has performed a login operation.

In the above telephone system, characterized in that the main device further includes a schedule table to which transfer destinations are written in units of a user for a predetermined time zone, means for detecting a transfer destination corresponding to the schedule table according to the time when data has been received; and means for transmitting the received data to a corresponding transfer destination.

The main device for performing the call control of the wireless telephone is characterized by determining a transmission destination (transfer destination) of a call received from, for example, the traffic state of the wireless-LAN base station or the login state of the wireless telephone, and transmitting data to the IP telephone network. The main device includes a function that preliminarily transmits data-reception notifying mail to a reception destination to enable a user to select a data-receiving method.

BRIEF DESCRIPTION OF THE DRAWINGS

FIG. 9 is a view showing a practical example of a login table included in a memory circuit of the main device shown in FIG. 2.

FIG. 10 is a view showing a practical example of a login table included in the memory circuit of the main device shown in FIG. 2.

FIG. 11 is a view showing a practical example of a traffic table included in the memory circuit of the main device shown in FIG. 2.

FIG. 12 is a view showing a practical example of a traffic table included in a memory circuit of a wireless-LAN base station in the telephone system shown in FIG. 1.

FIG. 15A is a view showing an example schedule table of a user A that is included in the memory circuit shown in FIG. 2.

FIG. 15B is a view showing a practical example of the schedule table shown in FIG. 15A.

DESCRIPTION OF THE PREFERRED EMBODIMENT

Hereinbelow, an embodiment of the present invention will be described with reference to the drawings.

Figure 1:
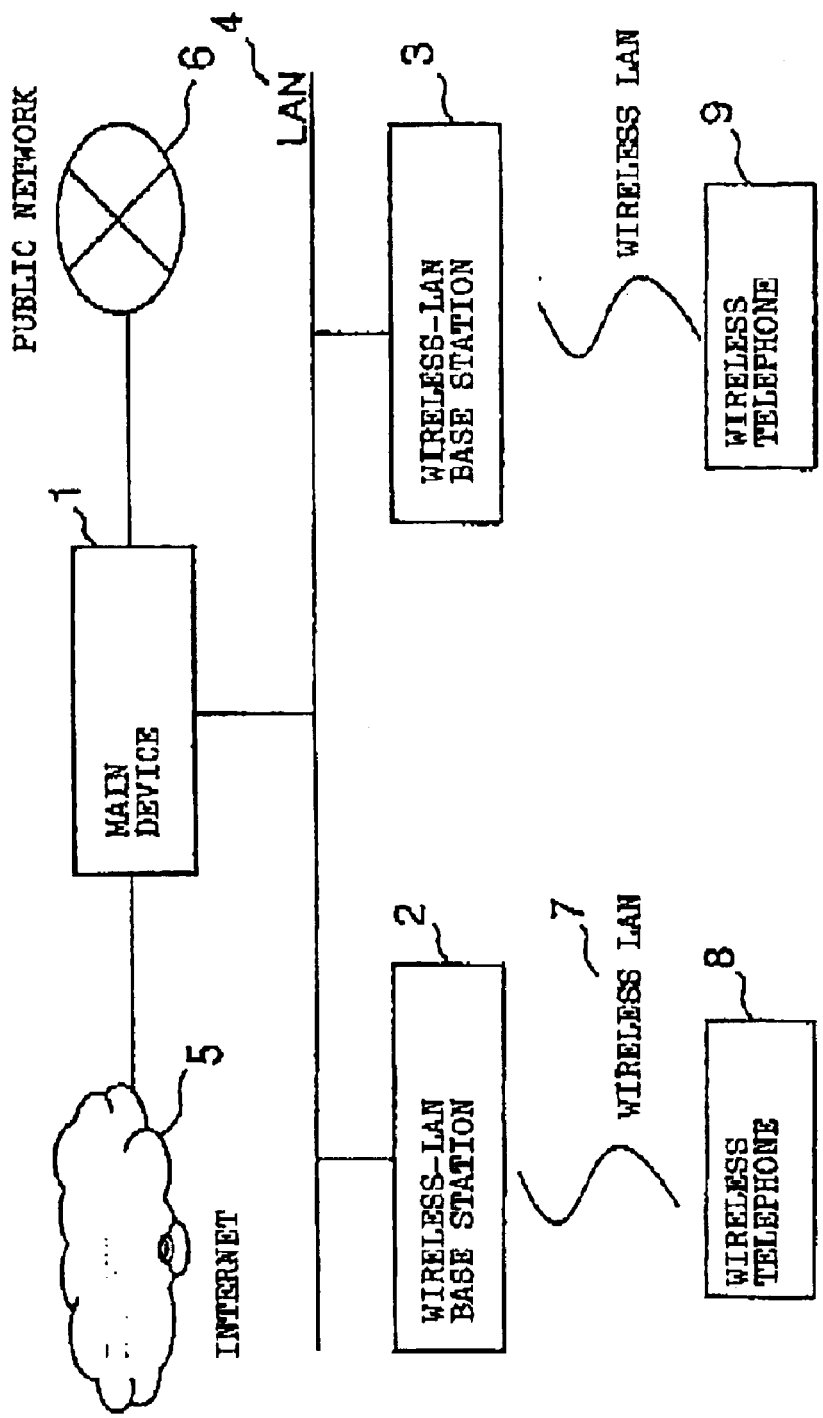
FIG. 1 is a block diagram showing the configuration of a telephone system according to an embodiment of the present invention.

Referring to FIG. 1, a telephone system of the embodiment will be described. The telephone system shown in the figure includes a main device 1, first and second wireless-LAN base stations 2 and 3, and first and second wireless telephones 8 and 9. The first and second wireless-LAN base stations 2 and 3 are connected (hardwired) to the main device 1 via a LAN 4. The first and second wireless telephones 8 and 9 are connected to the first and second wireless-LAN base stations 2 and 3, respectively, via a wireless LAN 7.

The first and second wireless telephones 8 and 9 perform IP communication via the wireless LAN 7. The main device 1 performs call control for the IP communication of the first and second wireless telephones 8 and 9. As described below, the first and second wireless telephones 8 and 9 each include a means for executing login to the main device 1 to perform IP communication. The "login" refers to, for example, a procedure or a command, for starting a communication service such as an e-mail service or personal-computer communication. The "login" is alternatively called "logon". In contrast, for example, a procedure or a command, for terminating communication is called "logout". As described below, the first and second wireless-LAN base stations 2 and 3 each include a means for transmitting traffic information containing, for example, the number of connected wireless telephones and the amount of communication, to the main device 1.

Figure 2:
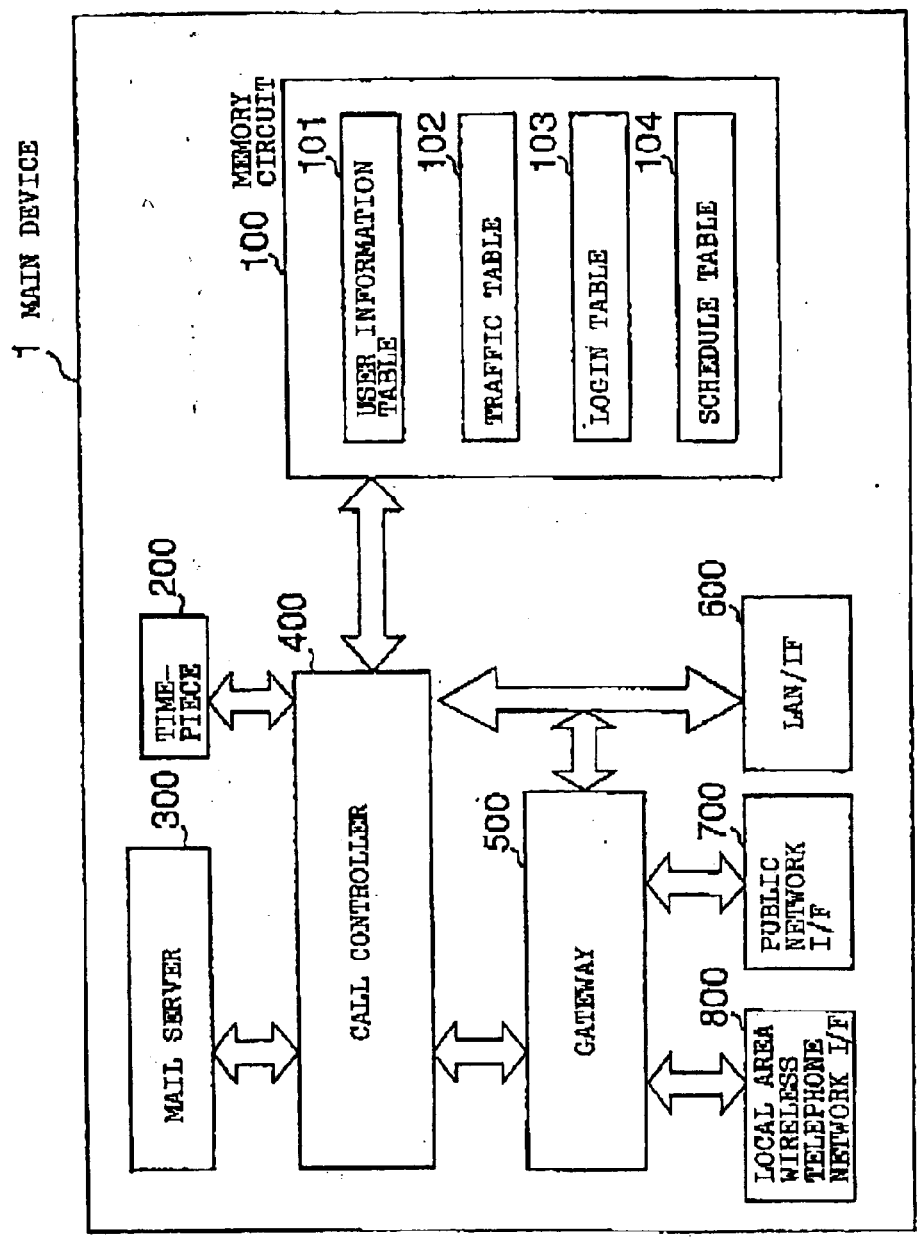
FIG. 2 is a block diagram showing the configuration of a main device used in the telephone system shown in FIG. 1.

Referring to FIG. 2, the main device 1 includes a memory circuit 100, a timepiece 200, a mail server 300 for transmitting mail, a call controller 400, a gateway 500, a LAN interface (I/F) 600 for connection to the Internet 5, a public-network interface (I/F) 700 for connection to a public network 6, and a local-area wireless telephone network interface (I/F) 800.

The memory circuit 100, the timepiece 200, and the mail server 300 are connected to the call controller 400. The LAN I/F 600 is connected to the call controller 400 and the gateway 500. The public-network interface 700 and the local-area wireless telephone network interface 800 are connected to the gateway 500.

The memory circuit 100 includes a login table 103 containing information about logged-in wireless telephones; a user information table 101 containing information of, for example, extension numbers, nicknames, and transfer destinations, which has been preset in units of a logged-in user; a traffic table 102 containing traffic information transmitted from the first and second wireless-LAN base stations 2 and 3; and a user schedule table 104.

Figure 3:
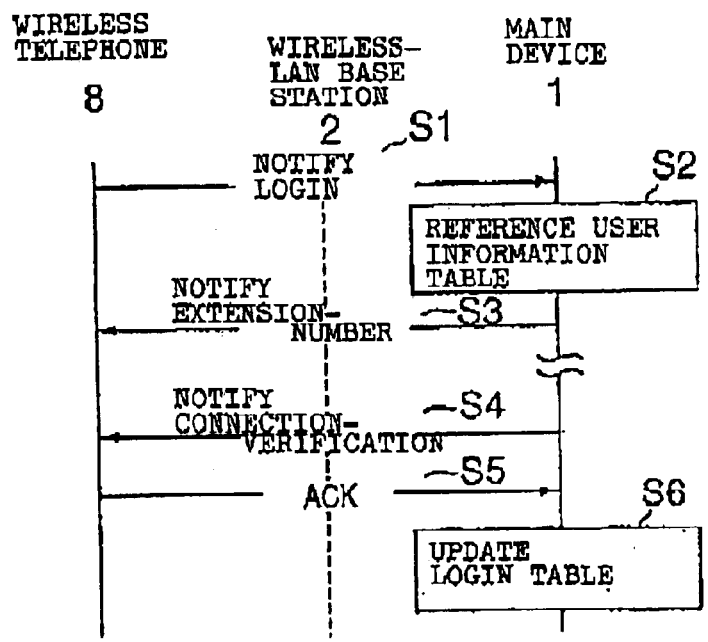
FIG. 3 is an explanatory view showing a series of operations from login notification to updating of a login table.

Next, a series of operations from login notification to updating of the login table 103 will be described with reference to FIGS. 3 and 4. FIG. 3 shows an example case where the main device 1 performs call control of the first wireless telephone 8 when the first wireless telephone 8 is connected to the first wireless-LAN base station 2 via the wireless LAN 7 (FIG. 1).

When executing login to the main device 1, the first wireless telephone 8 sets one of a predetermined user name and a per-login user name, and performs login notification of an IP address, a MAC address, and the user name to the main device 1 (S1 in FIG. 3). The "SSID" is an abbreviation of "service set ID" used as a wireless-LAN base station zone identifier. The SSID is arbitrarily set using 32 or fewer characters.

As described above, the main device 1 includes the login table 103 (FIG. 1) containing the received the information of the login notification. Upon receipt of the login notification (F1 in FIG. 4), the main device 1 references the user name in the login table 103 and the user information table 101 (FIG. 1) containing, for example, preregistered extension numbers and nicknames of users and transfer-destination telephone numbers (S2 in FIG. 3, and F2 in FIG. 4). If a match in the user names is detected ("Yes" at F3 in FIG. 4), the main device 1 notifies the first wireless telephone 8 of, for example, an extension number and a nickname (S3 in FIG. 3, and F4 in FIG. 4).

The main device 1 performs connection verification notification at a predetermined time interval to the logged-in first wireless telephone 8 (S4 in FIG. 3, and F5 in FIG. 4), and records a logged-in state into the login table 103. If an ACK (acknowledgment) is received from the first wireless telephone 8 (S5 in FIG. 3, and "Yes" at F6 in FIG. 4), the main device 1 inputs data representing "completion of connection" to the login table 103 (S6 in FIG. 3). On the other hand, no ACK is received in a predetermined time ("No" at F6 in FIG. 4), the main device 1 inputs an unlogged-in state to the login table 103 (F8 in FIG. 4).

Figure 4:
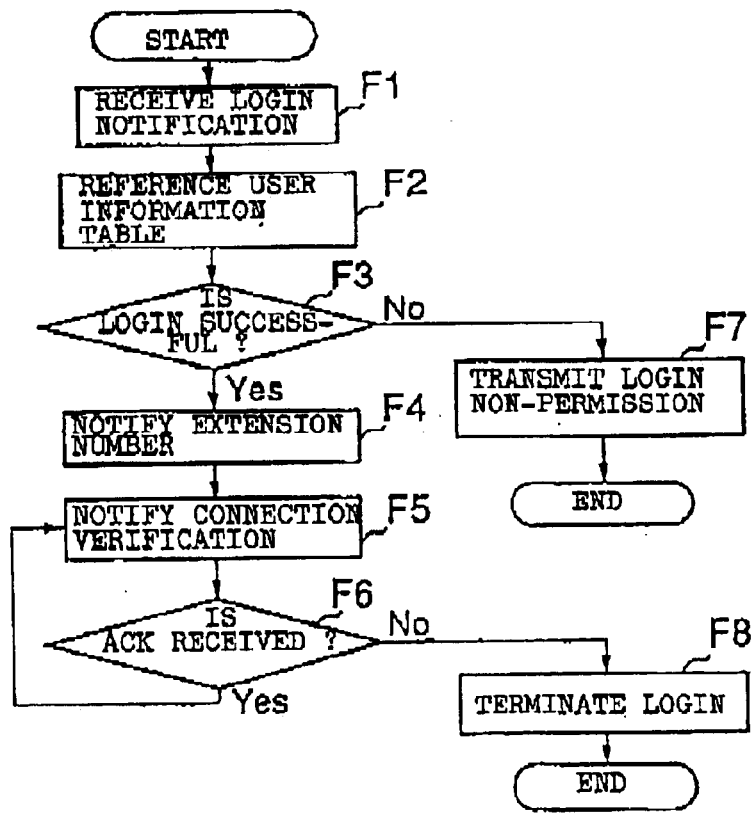
FIG. 4 is an explanatory flowchart showing a series of operations of the main device from the login notification to the updating of the login table.

If no match in the user names is detected ("No" at F3 in FIG. 4), the main device 1 transmits a login nonpermission notification (F7 in FIG. 4).

Figure 5:
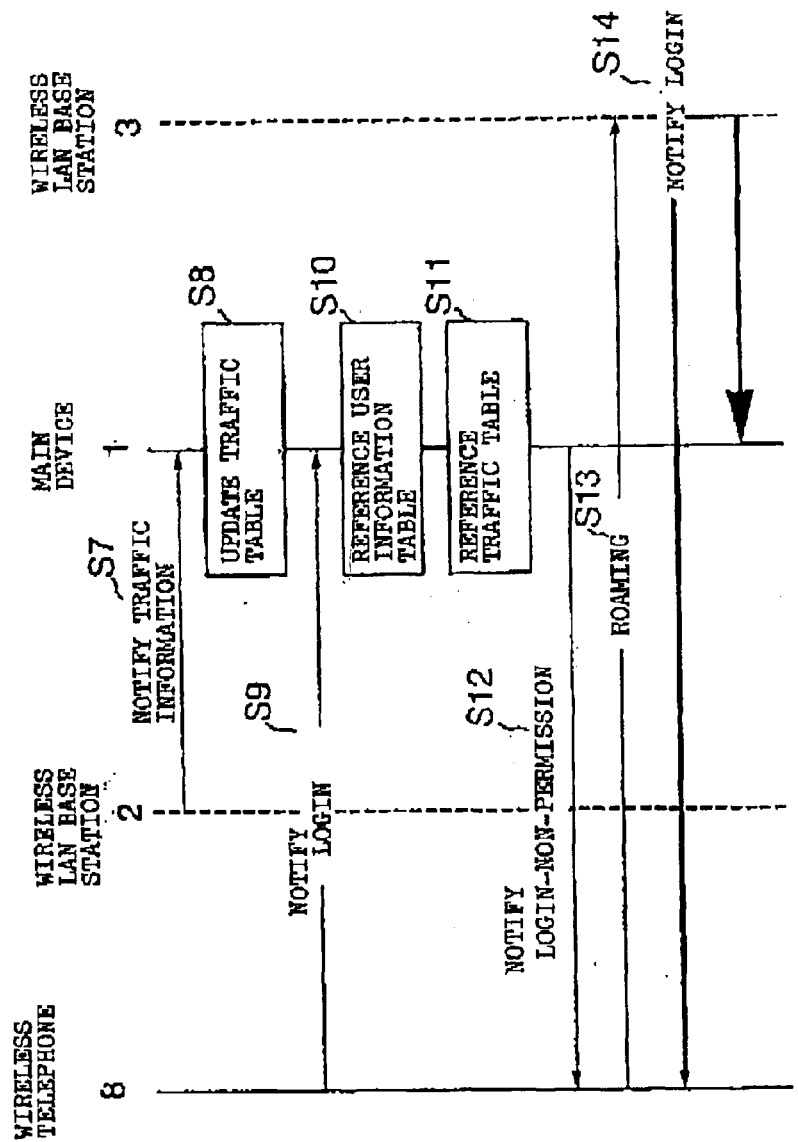
FIG. 5 is an explanatory view showing a series of operations from roaming, which is performed upon traffic-information notification, to a login operation performed again.

Next, a series of operations from roaming after traffic-information notification to a login operation performed again will be described with reference to FIG. 5. FIG. 5 shows an example case where, when the first wireless telephone 8 is connected to the first wireless-LAN base station 2 via the wireless LAN 7 (FIG. 1), the main device 1 performs call control of the first wireless telephone 8, and concurrently, the first wireless telephone 8 roams to the second wireless-LAN base station 3.

The "roaming" refers to a function that enables the first wireless telephone 8 to shift between base stations connected to the first wireless-LAN base station 2 and the second wireless-LAN base station 3 while performing mobile communication. The operation of roaming in the wireless LAN will be described below with reference to FIG. 8.

The first wireless-LAN base station 2 transmits traffic information containing information of SSIDs, wireless channels, the amount of transmission/reception, and the number of terminals in the local network to the main device 1 at a predetermined time interval (S7).

The main device 1 monitors the traffic table 102 to which the received traffic information is written in units of the wireless-LAN base station at a predetermined time interval (S8).

Upon receipt of a login notification from the first wireless telephone 8 (S9), the main device 1 references traffic information corresponding to the SSID contained in the login notification (S10 and S11). When the referenced traffic information has exceeded a predetermined traffic value, the main device 1 notifies the first wireless telephone 8 of login nonpermission because of an overload in the base station (S12).

In response to the login nonpermission, the first wireless telephone 8 roams according to a procedure regulated by IEEE 802.11f (S11), and performs a login operation again (S12).

Figure 8:
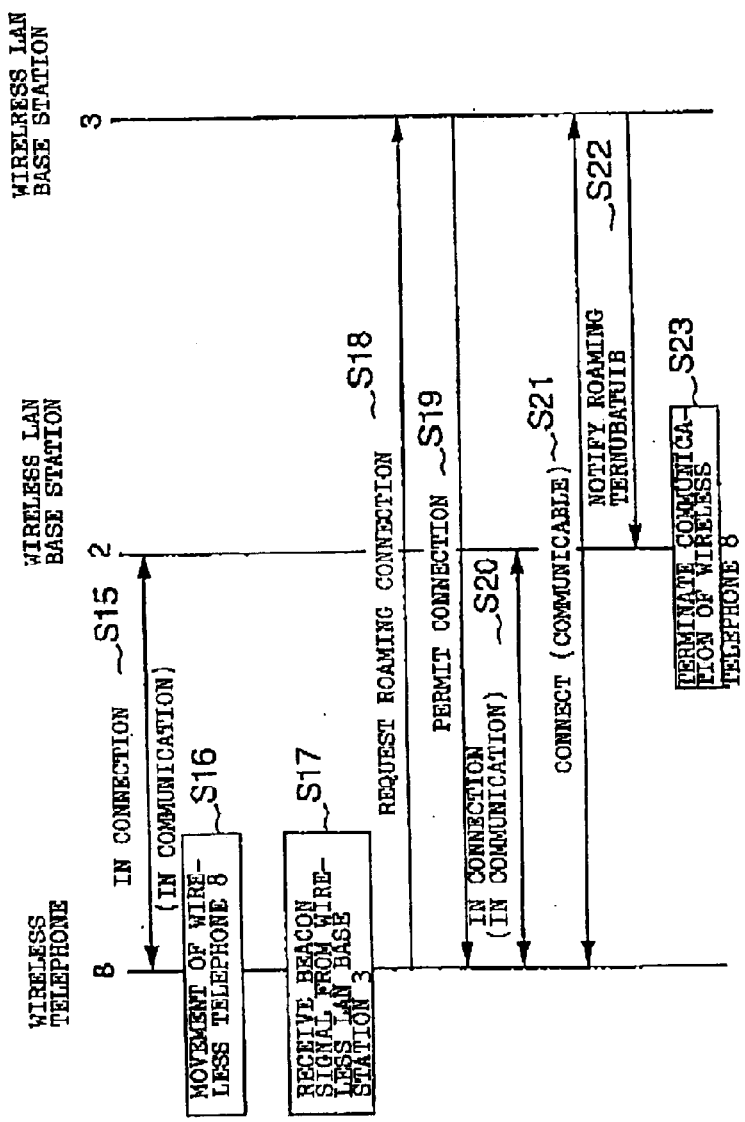
FIG. 8 is an explanatory view showing roaming operations performed in a wireless LAN and a procedure regulated by IEEE 802.11f.

The procedure regulated by IEEE 802.11f will be described below in detail with reference to FIG. 8.

In response to a transmission with a nickname of the first wireless telephone 8, the main device 1 references the user information table 101 and detects a user name corresponding to the nickname. Subsequently, the main device 1 retrieves the detected user name from the login table 103, and retrieves a transmission-destination IP address therefrom. An operation cannot be performed to log into the wireless-LAN base station, except for a predetermined account contained in the SSID information in the user information table 101.

The main device 1 monitors the traffic table 102 to which received traffic information is written in units of the wireless-LAN base station at a predetermined time interval. Thereafter, when the received traffic information has exceeded a predetermined traffic value, the main device 1 performs overload notification to wireless telephones connected to the overloaded base station through the local-area wireless telephone network interface 800, and requires modification in an audio codec that is used in communication.

Figure 6:
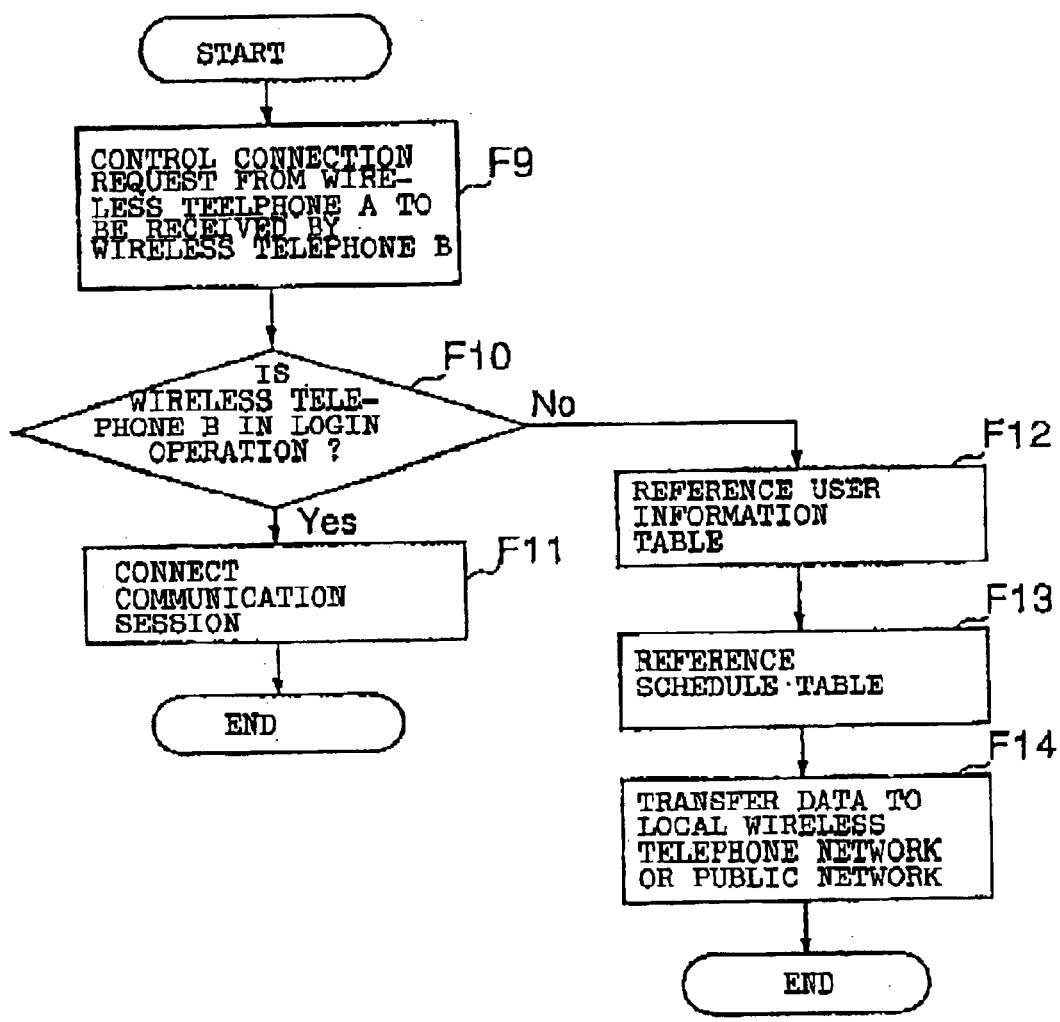
FIG. 6 is an explanatory view showing an example series of operations from reception of incoming data in an unlogged-in wireless telephone to transfer of the incoming data to a predetermined transfer destination.

Hereinbelow, referring to FIG. 6, a description will be provided to an example series of operations from reception of incoming data in an unlogged-in wireless telephone to transmission of the received data to a predetermined transfer destination. The public-network interface 700 of the main device 1 includes a function of dialing into the public network 6.

A case is assumed in which an unlogged-in wireless telephone has received incoming data ("No" at F9 and F10). Specifically, the case assumed such that a request for connection to the second wireless telephone 9 (wireless telephone B) has been received from the first wireless telephone 8 (wireless telephone A) (S9), and the second wireless telephone 9 (wireless telephone B) is not in a login operation ("No" at F10). In this case, the main device 1 references the user information table 101 and the login table 103 (F12 and F13), and the request for connection (received data) is transmitted to a transfer-destination public network at a predetermined telephone number (S14).

The main device 1, which includes the wireless-LAN base stations 2 and 3 for the respective wireless telephones 8 and 9, references traffic information in the traffic table 102 of the wireless-LAN base station, in which the reception-destination wireless telephone is registered. When the referenced traffic information has exceeded a predetermined amount of transmission/reception and a predetermined number of terminals, the main device 1 references the user information table 101, and transmits the aforementioned request for connection to a predetermined local-area wireless telephone of a transfer-destination local network.

Figure 7:
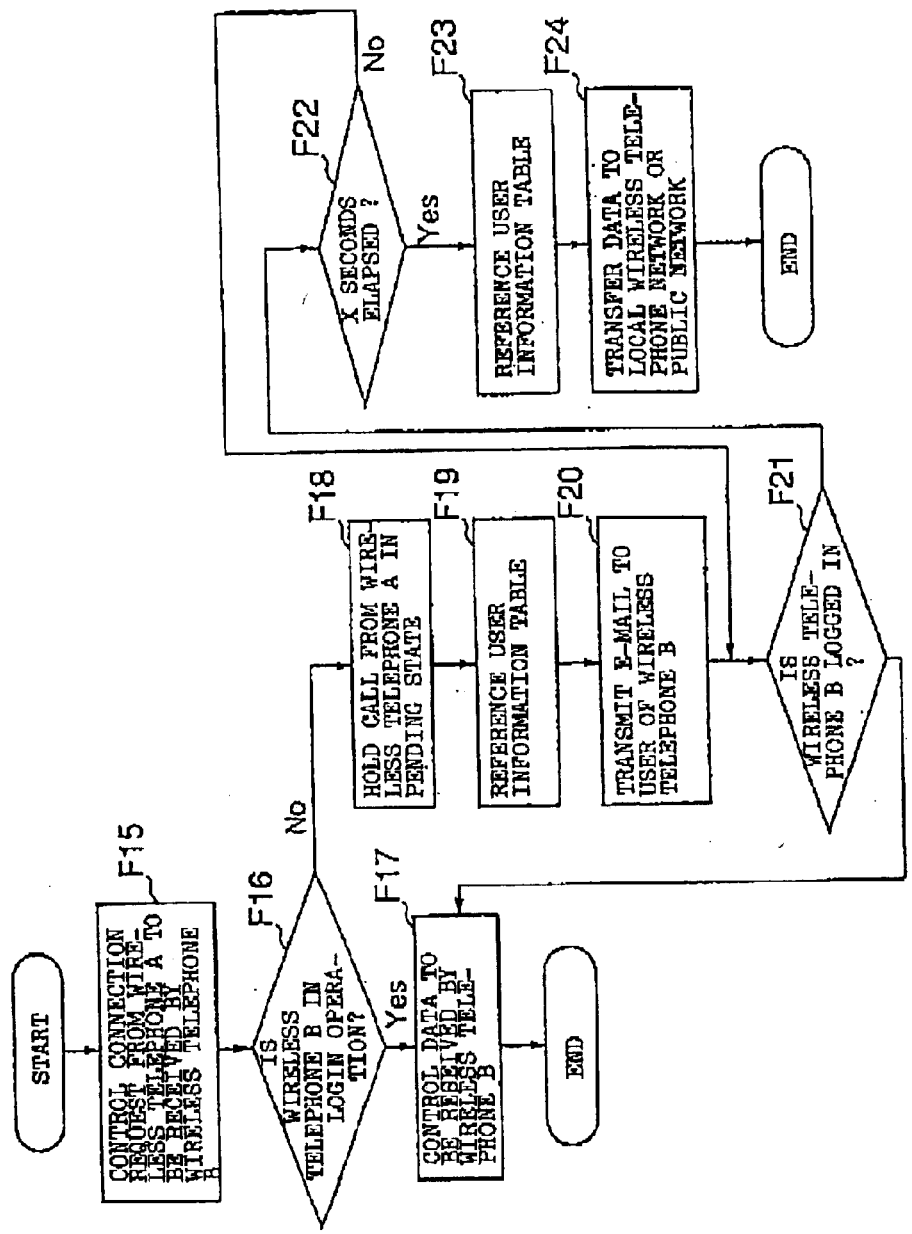
FIG. 7 is an explanatory view showing another example series of operations from reception of incoming data in an unlogged-in wireless telephone to transfer of the incoming data to a predetermined transfer destination.

Next, referring to FIG. 7, a description will be provided to another example series of operations from reception of incoming data in an unlogged-in wireless telephone to transmission of the received data to a predetermined transfer destination.

A case is assumed in which an unlogged-in wireless telephone has received incoming data in the main device 1 ("No" at F15 and F16). Specifically, the case assumed such that the main device 1 has received a request for connection to the second wireless telephone 9 (wireless telephone B) from the first wireless telephone 8 (wireless telephone A) (S9), and the second wireless telephone 9 (wireless telephone B) is not in a login operation ("No" at F16). In this case, first, the main device 1 holds a call of the first wireless telephone 8 (wireless telephone A) in the state of pending for a predetermined time (F18). Subsequently, the main device 1 references the user information table 101 (F19), and notifies a user of the second wireless telephone 9 (wireless telephone B) at a predetermined e-mail address to prompt data-reception and a login operation (F20). When the second wireless telephone 9 (wireless telephone B) has performed a login operation in the pending state ("Yes" at F21), the main device 1 releases the pending state, thereby causing the second wireless telephone 9 (wireless telephone B) to be communicable (F17). However, when the second wireless telephone 9 (wireless telephone B) has not performed a login operation even after passage of X seconds ("No" at F21, and "Yes" at F22), the main device 1 references the user information table 101 (F23), and transfers the received data to either a local-area wireless telephone network or a public network (F24).

As described above, the main device 1 includes the user schedule table 104 in which a transfer destination is written corresponding to the time zone predetermined for each user. The main device 1 detects a transfer destination corresponding to that in the user schedule table 104 according to the time of data reception, and transfers the received data to the corresponding destination.

Next, referring to FIG. 8, the operation of roaming in the wireless LAN and a procedure regulated by IEEE 802.11f will be described.

As described above, the "roaming" refers to the function that enables the first wireless telephone 8 to shift between base stations connected to the first wireless-LAN base station 2 and the second wireless-LAN base station 3 while performing mobile communication.

A case is assumed in which, in a state of being connected to the first wireless-LAN base station 2 (S15), the first wireless telephone 8 moves (S16), and the first wireless telephone 8 moves away from the first wireless-LAN base station 2. In this case, a reduction occurs in the field intensity of a beacon signal transmitted from the first wireless-LAN base station 2 in the main device 1. When the field intensity is reduced lower than a predetermined threshold value, the first wireless telephone 8 searches for a beacon signal in each frequency band.

As a result of the search, the main device 1 receives a beacon signal transmitted from the second wireless-LAN base station 3 (S17). When the field intensity of the received beacon signal is higher than a predetermined threshold value (which is normally set somewhat higher than the field intensity of the first wireless-LAN base station 2), the first wireless telephone 8 transmits a request for roaming connection to the second wireless-LAN base station 3 (S18).

Hereinbelow, a procedure regulated by IEEE 802.11f will be described.

The first wireless telephone 8 transmits the "request for roaming connection" to the second wireless-LAN base station 3 that will roam (S18). Upon receipt of the request for roaming connection, the second wireless-LAN base station 3 transmits a connection permission to the first wireless telephone 8 (S19). Thereby, when the first wireless telephone 8 is connected to the first wireless-LAN base station 2 (in communication) (S20), the first wireless telephone 8 and the second wireless-LAN base station 3 become communicable with each other (S21). Upon transmission of the connection permission, the second wireless-LAN base station 3 transmits a roaming termination notification to the first wireless-LAN base station 2 connected to the first wireless telephone 8 prior to the roaming (S22). Upon receipt of the roaming termination notification, the first wireless-LAN base station 2 discontinues the connection to the first wireless telephone 8 (S23).

FIG. 9 shows a practical example of the login table 103 included in the memory circuit 100 of the main device 1. The login table 103 includes a user name field 103-1, an IP address field 103-2, a MAC address field 103-3, and an SSID field 103-4.

FIG. 10 shows a practical example of the user information table 101 included in the memory circuit 100 of the main device 1. The user information table 101 includes a user name field 101-1, an extension number field 101-2, a nickname field 101-3, a first transfer-destination telephone number field 101-4, and a second transfer-destination telephone number field 101-5.

FIG. 11 shows a practical example of the traffic table 102 included in the memory circuit 100 of the main device 1. The traffic table 102 includes an extension number field 101-2 includes an SSID field 102-1, a wireless-channel value field 102-2, a connected-wireless-telephone number field 102-3, and a transmission packet number field 102-4, and a reception packet number field 102-5.

FIG. 12 shows a practical example of a traffic table 203 contained in a memory circuit of a base station described below. The traffic table 203 includes an SSID field 203-1, a wireless-channel value field 203-2, a connected-wireless-telephone number field 203-3, a transmission packet number field 203-4, and a reception packet number field 203-5.

Figure 13:
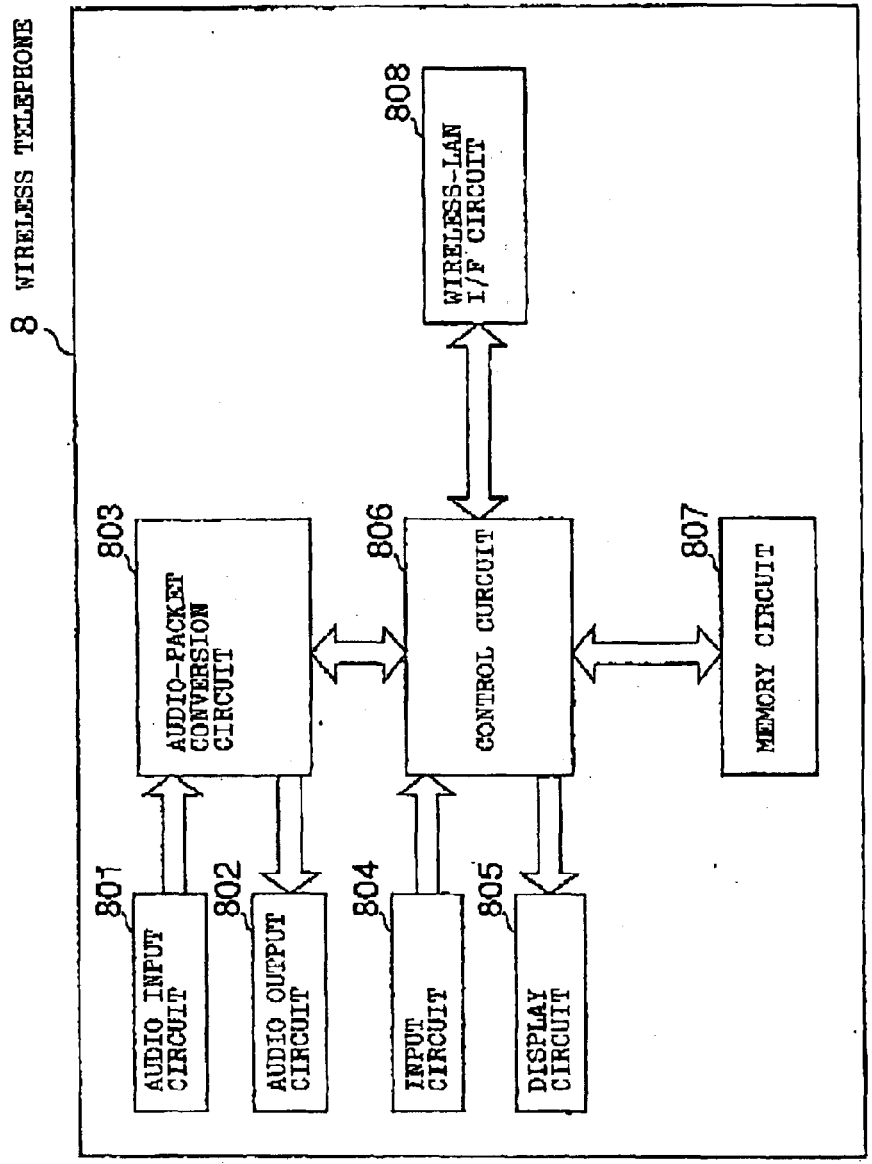
FIG. 13 is a block diagram showing the configuration of a wireless telephone used in the telephone system shown in FIG. 1.

FIG. 13 is a block diagram showing the configuration of the first wireless telephone 8. Although not shown in the drawing, also the second wireless telephone 9 has the same configuration as that of the first wireless telephone 8.

The first wireless telephone 8 includes an audio input circuit 801 such as a microphone for inputting sounds, and an audio output circuit 802 such as a speaker for outputting sounds. Further, the first wireless telephone 8 includes an audio-packet conversion circuit 803 connected to the audio input circuit 801 and the audio output circuit 802. The audio-packet conversion circuit 803 includes a function of forming an IP packet of audio data entered from the audio input circuit 801, and also includes a function of reproducing audio data from an IP packet and transmitting the audio data to the audio output circuit 802.

The first wireless telephone 8 further includes an input circuit 804, a display circuit 805, a control circuit 806, a memory circuit 807, and a wireless-LAN interface (I/F) circuit 808. The input circuit 804 used by an operator (communicating person) to input a user name at the time of performing an operation of login to the main device 1 and to input a number of a communication destination. The memory circuit 807 includes a function of preliminarily storing a logged-in user name. In this case, a plurality of user names may be stored into the memory circuit 807. The wireless-LAN I/F circuit 808 is an interface circuit for performing communication according to a wireless LAN method represented by IEEE 802.11f.

Figure 14:
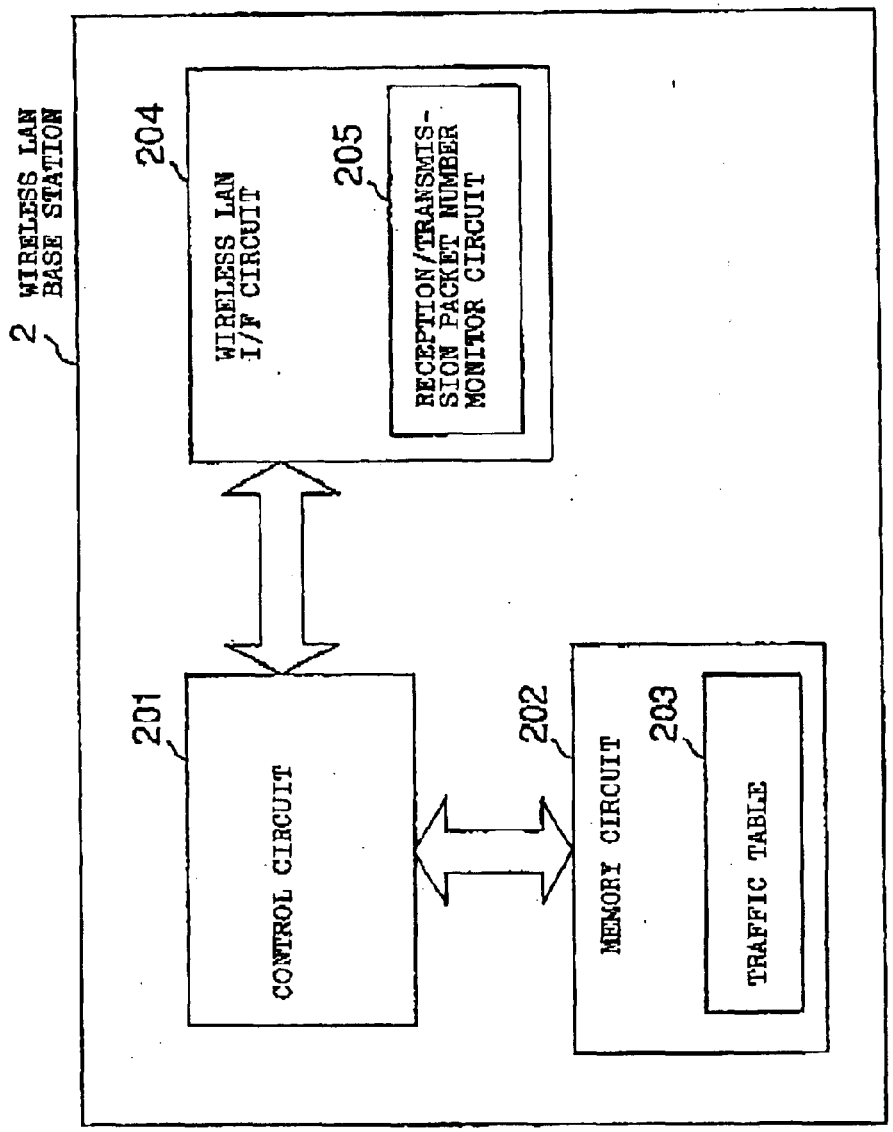
FIG. 14 is a view showing the configuration of the wireless-LAN base station used in the telephone system shown in FIG. 1.

FIG. 14 is a block diagram showing the configuration of the first wireless-LAN base station 2. Although not shown in the drawing, also the second wireless-LAN base station 3 has the same configuration as that of the first wireless-LAN base station 2.

The first wireless-LAN base station 2 includes a control circuit 201, a memory circuit 202 including the traffic table 203, and a wireless-LAN I/F circuit 204 including a reception/transmission packet number monitor circuit 205.

The wireless-LAN I/F circuit 204 is an interface circuit for performing communication according to the wireless LAN method represented by IEEE 802.11f. The reception/transmission packet number monitor circuit 205 included in the wireless-LAN I/F circuit 204 counts the number of packets transmitted and received by the first wireless-LAN base station 2. The control circuit 201 records the counting result of the reception/transmission packet number monitor circuit 205 into the traffic table 203. The control circuit 201 includes a function of transmitting record contents of the traffic table 203 to the main device 1 at a predetermined time interval.

FIG. 15 show examples of the user schedule table 104 included in the memory circuit 100 of the main device 1. FIG. 15A shows an example of the schedule table 104; and FIG. 15B shows a practical example thereof.

From the schedule table 104 shown in FIG. 15A, it can be known that a user A has patterns A to D. FIG. 15B shows practical examples of the patterns A to D.

The schedule table 104 is of course not limited to the patterns shown in FIG. 15. For example, an extension number recorded into the user information table 101 may be set to the pattern A; a first transfer-destination telephone number may be set to the pattern B; a second transfer-destination telephone number nay be set to the pattern C; and other items may also be set to patterns in the similar manner.

In addition, the days of the week and the time zones are not limited to those shown in FIG. 15. For example, the time zones may be set every one hour. Further, the schedule table 104 may be saved in the HTML (hypertext markup language) so that it can be viewed through a web browser, and schedules can be input.

Needless to say, the present invention is not limited by the above-described embodiment, and various modifications may be imparted thereto without departing from the scope of the invention.

Hereinbelow, the system according to the present embodiment of the present invention will be described in detail.

FIG. 1 is a block diagram showing a network configuration of the telephone system according to the embodiment of the present invention.

The wireless telephones 8 and 9 each include a means (not shown) of performing communication by using the IP (internet protocol). The wireless telephones 8 and 9 are connected to the wireless-LAN base stations 2 and 3 that individually include a means (not shown) of bridging the wireless LAN 7 and the LAN 4 via the wireless LAN 7. In addition, the wireless telephones 8 and 9 are connected to the main device 1 that includes a means (not shown) of performing call control for IP communication of the wireless telephones via the LAN 4. The interface of the wireless telephone is not limited to the wireless-LAN IF, but may be a known LAN such as 10 Base-T or 100 Base-T.

FIG. 2 is a block diagram showing an internal configuration of the main device 1 a main device used in the system according to the embodiment of the present invention.

The main device 1 interfaces with the LAN 4 via the LAN I/F 600, and is connected to the first and second wireless-LAN base stations 2 and 3 via the LAN 4. The portion of the LAN I/F 600 is not limited to the LAN I/F, but the device may include a wireless-LAN I/F circuit to be connected to the wireless telephone.

The main device 1 includes the memory circuit 100 that stores the login table 103 used to record login information notified from the wireless telephones 8 and 9 in units of a user name and that stores the user information table 101 used to store extension numbers and nicknames of users who are preregistered in units of a user name and are granted permission for connection to the main device 1; and the call controller 400 for controlling IP communication of the wireless telephones 8 and 9. In addition, the call controller 400 includes a means (not shown) that extracts a user name contained in a predetermined portion of the login information notified from each of the wireless telephones 8 and 9 and that compares the user name with a user name written into the user information table 101.

FIG. 13 is a block diagram of a wireless telephone 8 or 9 in a system according to a first embodiment of the present invention.

The wireless telephone 8 or 9 includes a memory circuit 807 for storing a predetermined user name, and an input circuit 804 used by an operator to set a user name in units of a login operation.

A plurality of predetermined user names may be recorded into the memory circuit 807. In addition, the operator may select a user name either from a plurality of user names recorded in the memory circuit 807 or from user names input from the input circuit 804.

The wireless telephone 8 or 9 includes the control circuit 806. At the time of performing an operation of login to the main device 1, the control circuit 806 performs control so that the main device 1 is notified of login information including an IP address, a MAC address, a user name recorded in the memory circuit 807, a user name input from the input circuit 804, a user name selected from a plurality of user names, and a wireless-LAN base station SSID (zone identifier of the wireless-LAN base station). The control circuit 806 includes a means (not shown) of requesting the main device 1 for connection to the transmission destination address (such as an extension number, an IP address, and a nickname) input through the input circuit 804 and for thereby performing IP communication.

Next, operation of the wireless telephone 8 or 9 in the system according to the first embodiment will be described.

When connecting to the main device 1 in the IP network via the wireless LAN 7, the wireless telephone 8 performs a login operation by transmitting the above-described login information to the main device 1.

The main device 1 inputs the login information received from the wireless telephone 8 via the LAN I/F 600 to the call controller 400.

The call controller 400 extracts a user name written in a predetermined portion of the received login information, and compares the user name with user names recorded in a user information table 101. If a match in the user names is detected ("Yes" at F3 in FIG. 4), the call controller 400 records the received login information (S6 in FIG. 3), and transmits an extension number and a nickname recorded in the user information table 101 to the wireless telephone 8 that has issued a login request (not shown). The "nickname" refers to an arbitrary character string for identifying the user.

Upon receipt of the extension number and the nickname, the login operation of the wireless telephone 8 is completed. Consequently, incoming data can be received using the extension number and the nickname of the wireless telephone 8.

When a user name transmitted from the wireless telephone 8 is already logged in, the wireless telephone 8 transmits the login nonpermission notification (F7 in FIG. 4). When another logged-in wireless telephone is not in communication, the main device 1 may either permit login of a newly logged-in wireless telephone 8 or may causes the other logged-in wireless telephone to log out.

The second wireless telephone 9 performs a login operation similar to the above.

The first embodiment described above is advantageous in that an operator can know the number of wireless telephones connected to the wireless-LAN base station by referencing the login table 103 of the main device 1. This enables the provision of a maintenance service that limits login entries according to the aforementioned information to prevent concentric connection of wireless telephones to a single wireless-LAN base station. Alternatively instead of providing the limitation to the service of restricting the login entries, a notification may be issued to cause a wireless telephone to connect to another base station.

In addition, the operator can monitor the login state of logged-in wireless telephones by referencing the login table 103 of the main device 1.

A conventional telephone number system needs not be changed for a wireless telephone logged into the main device 1. In addition, without the main body of the wireless telephone moved, incoming data can be received with the same extension number and nickname at a remote place by performing the login operation at the remote place.

Next, a second embodiment will be described hereinbelow.

The main device 1 includes a means (not shown) of performing connection verification notification at a predetermined time interval to a logged-in wireless telephone 8, and a means (not shown) of recording a logged-in state into a login table 103. In addition, the main device includes a means (not shown) of deleting information regarding a wireless telephone from the login table 103 when an ACK is not received from the wireless telephone. The record of the login state may be of a record indicating existence/nonexistence of information regarding a wireless telephone recorded in the login table 103.

Operation of a system according to the second embodiment of the present invention will be described hereunder.

The main device 1 performs a connection verification at a predetermined time interval to a wireless telephone connected according to the login operation described in the first embodiment. Upon receipt of a notification of the connection verification, the wireless telephone transmits an ACK to the main device 1.

Upon receipt of the ACK transmitted from the wireless telephone, the main device 1 does not update the login table 103; and when no ACK has been received in a predetermined time, the main device deletes information regarding the wireless telephone from the login table 103.

The second embodiment is advantageous in that a user-login state can be verified by referencing the login table 103. This enables the provision of a presence verification service that enable a state of a transmission-destination wireless telephone to be known prior to transmission (dialing) by notifying a wireless telephone of the verified login information to a wireless telephone.

Next, a system according to a third embodiment of the present invention will be described.

The wireless-LAN base station 2 or 3 includes a means (not shown) of transmitting traffic information containing information of SSIDs, wireless channels, the amount of transmission/reception, and the number of terminals in the local network to the main device 1 at a predetermined time interval. The traffic information is not limited to the information containing information of the SSIDs, the wireless channels, the amount of transmission/reception, and the number of terminals.

The main device 1 includes a means (not shown) of referencing the traffic table 102 to which the traffic information, which has been received from the wireless-LAN base station, is written in units of the wireless-LAN base station, at a predetermined time interval.

Hereinbelow, operation of the system according to the third embodiment will be described.

Upon receipt of the login notification described in the first embodiment, the main device 1 references traffic information corresponding to the SSID contained in the login notification (S10 and S11). When the information has exceeded a predetermined traffic value, the main device 1 notifies the wireless telephone of login nonpermission because of an overload in the base station. The predetermined traffic value represents, for example, the number of terminals connectable to a single wireless-LAN base station, the amount of transmission/reception data in the wireless-LAN base station, or the like.

In response to the login nonpermission, the wireless telephone roams into a neighboring base stations according to a procedure regulated by IEEE 802.11f, and performs a login operation from a wireless-LAN base station different from the wireless-LAN base station that notified the login nonpermission.

The third embodiment of the present invention is advantageous in that since the main device 1 monitors the traffic states of the wireless-LAN base stations 2 and 3, concentric login to a single wireless-LAN base station can be automatically prevented, and deterioration in the communication service can be prevented from being caused due to overloaded traffic.

Next, operation of a system according to a fourth embodiment will be described hereinbelow.

The main device 1 includes a means (not shown) of retrieving a user name corresponding to a nickname dialed by the wireless telephone from the user information table 101, a means (not shown) of referencing the login table 103 for the login state of a detected reception user, and a means (not shown) of referencing an transmission-destination IP address in the login table 103.

In the means for retrieving the user name corresponding to the dialed nickname, the object to be called is not limited to the nickname.

Operation of the system according to the fourth embodiment of the present invention will be described hereinbelow.

The wireless telephone 8 or 9 dials a nickname of a desired communication destination.

The main device 1 references the user information table 101 for a nickname dialed by the wireless telephone, and designates a user corresponding to the matched nickname.

After the designation of the user with whom communication is desired to be performed, the main device 1 references the login table 103. When a destination wireless telephone of a user with whom communication is desired to be performed exists among logged-in wireless telephones, the main device 1 retrieves an IP address recorded in the login table 103, and notifies the IP address of the destination wireless telephone to the wireless telephone that has dialed the nickname.

The fourth embodiment of the present invention is advantageous in that an operator of each of the wireless telephones 8 and 9 performs login operations from a wireless telephone located at a remote place, data addressed to the user can be received by the wireless telephone located at the remote place.

Hereinbelow, a system according to a fifth embodiment of the present invention will be described.

The main device 1 includes a means (not shown) of requesting a modification in an audio codec used in communication for call control of the wireless telephone 8 or 9. The wireless telephone 8 or 9 includes a means (not shown) of modifying the audio codec (represented by, for example, G.711 or G.729) in conformance to the request of the main device 1. However, the modification object is not limited to the audio codec. For example, when a wireless telephone including a video telephone function is used, the wireless telephone may include a means for modifying a video codec. In addition, the wireless telephone 8 or 9 may include a means for modifying the codec compression ratio (bit rate).

Operation of the system according to the fifth embodiment of the present invention will be described hereinbelow.

Upon receipt of dial information of a communication destination to which the wireless telephone 8 or 9 performs transmission, the main device 1 designates a wireless-LAN base station to which the wireless telephone is connected, according to the login information. When the information has exceeded a traffic value predetermined by referencing the traffic table 203 of the wireless-LAN base station, the main device 1 requests the wireless telephone to modify an audio codec used in audio communication. When the wireless telephone includes an audio codec modifiable to the codec-modification request received from the main device 1, the wireless telephone modifies the audio codec.

The fifth embodiment of the present invention is advantageous in that when the network traffic has exceeded the predetermined traffic, the traffic in the network can be reduced by modifying an audio codec and/or a video codec to a codec with a smaller amount of communication.

Hereinbelow, a system according to a sixth embodiment of the present invention will be described.

The main device 1 includes a means (not shown) of dialing into the public network (PSTN) 6, and the means 500 for providing a gateway function for an IP-network communication and the public network 6. Further, the main device 2 includes a means (not shown) of dialing into a local-area PHS network in addition to the public network 6.

Hereinbelow, operation of the system according to the sixth embodiment will be described.

The wireless telephone 8 or 9 dials one of a telephone number and a nickname of a communication destination. Upon receipt of the dial information, the main device 1 references the login table 103 to verify the login state of the communication destination. The main device 1 includes a means (not shown) that references the user information table 101 and transfers data to a telephone number of a predetermined transfer-destination public telephone network when the communication destination is in an unlogged-in state. The transfer destination is not limited to the public network 6, but may be an extension number, a nickname, or a local-area PHS number. In addition, the case is not limited to the above where one of the wireless telephones 8 and 9 dials into the destination, but includes a case where, for example, the public network 6 or a local-area analog network, dials into the destination.

In addition, for example, when the traffic state in the network described in the third embodiment is represented by a traffic value degrading the quality of IP communication, the local-area analog network or the local-area PHS network is dialed in.

The sixth embodiment is advantageous in that depending on the login state in the destination and the traffic state of the IP network, the destination can be changed so that the audio quality in communication is dynamically improved, or the communication charge is reduced.

Hereinbelow, a seventh embodiment of the present invention will be described.

The main device 1 includes a means for holding a call for communication, a means (not shown) of recording e-mail addresses into the user information table 101, and a means (not shown) of transmitting e-mail having predetermined contents.

Hereinbelow, operation of the seventh embodiment will be described.

The wireless telephone 8 or 9 dials one of a telephone number and a nickname of a communication destination. Upon receipt of the dial information, the main device 1 references the login table 103 to verify the login state of the communication destination. When the communication destination is currently in an unlogged-in state, the main device 1 controls a call of a transmitting-side wireless telephone either to be in a pending state for a predetermined time or to be in a calling state, references the user information table 101, records the contents of data received from the wireless telephone, and transmits the data to an e-mail address of a reception-destination user.

The data reception may be notified not only by using e-mail, but may also be notified to, for example, a portable telephone or the public network 6, via an audio guidance.

When the reception-destination wireless telephone has logged-in during the pending state or the calling state, the main device 1 either releases the pending state of the wireless telephone to be communicable or controlling a call sound to be output.

When a login operation is not performed even after the predetermined time has elapsed, the main device 1 dials into the transfer destination recorded in the user information table 101.

The seventh embodiment is advantageous even in the case of incoming data to a user who has not currently logged in, the system does not immediately dial into the transfer destination, but notifies the reception-side user of the data reception prior to transmission, thereby enabling the reception-destination user to perform communication at a current location considered preferable.

Hereinbelow, an eighth embodiment of the present invention will be described.

The main device 1 includes the schedule table 104 to which a transfer destination for predetermined time zones are written for each user; a means (not shown) of detecting a transfer destination corresponding to that in the user schedule table 104 according to the time of data reception, and a means (not shown) of transferring data to the corresponding destination. The schedule table 104 may be a schedule table usable as a general-purpose PIM (personal information manager). In addition, the main device 1 may include a means working synchronously with the general-purpose schedule table.

What is claimed is:

1. A telephone system comprising:
    wireless telephones,
    a plurality of wireless-LAN base stations connected to the wireless telephones via a wireless LAN, and
    a main device that is connected to the plurality of wireless-LAN base stations and that performs call control of the wireless telephones, and
    wherein the wireless telephone comprises;
        storing means for storing a predetermined user name and input means for inputting a user name in units of an operation of login when performing an operation of login into the main device; and
        means for performing login notification of an IP address, a MAC address, either one of a user name stored in the storing means and a user name input from the input means, and an SSID of wireless-LAN base station connected to the wireless telephone, and
    wherein the main device comprises;

a login table for storing login information notified by the wireless telephone in units of a user name;

a user information table for storing an extension number and a nickname of a user that are preregistered in units a user name; and means that performs a comparison of information in the user information table and notifies the wireless telephone of the extension number and the nickname when a user name in the user information table matches a user name sent in the login notification, and that stores the login information notified by the wireless telephone.

2. A telephone system as claimed in claim 1, wherein the main device further comprises:

means for performing connection verification notification to the logged-in wireless telephone at a predetermined time interval;

means for recording a login state into the login table;

means for inputting connection completion to the login table upon receipt of an ACK from the wireless telephone; and means for inputting an unlogged-in state into the login table when an ACK is not received in a predetermined time.

3. A telephone system as claimed in claim 1, wherein:

the wireless-LAN base station comprises means for transmitting traffic information containing information of SSIDs, wireless channels, an amount of transmission/reception, the number of wireless telephone terminals connected to the wireless-LAN base station in a local network to the main device at a predetermined time interval; and wherein the main device comprises means for monitoring a traffic table to which the received traffic information is written in units of the wireless-LAN base station, at a predetermined time interval; and wherein the main device having received the login notification comprises:

means for referencing the traffic information in the traffic table that corresponds to an SSID contained in the login notification, and means for notifying the wireless telephone of login nonpermission due to a base station overload when the referenced traffic information has exceeded a predetermined traffic value; and wherein the wireless telephone comprises means that roams into a neighboring one of the wireless-LAN base stations according to a procedure regulated by IEEE 802.11f in response to the login nonpermission and that performing a login operation again.

4. A telephone system as claimed in claim 1, wherein the main device further comprises:

means that references the user information table in response to transmission performed by the wireless telephone by using a nickname and that detects a user name corresponding to the nickname;

means that retrieves the detected user name from the login table and that obtains a transmission-destination IP address; and means for preventing the wireless-LAN base station from logging into a predetermined account contained in SSID information in the user information table.

5. A telephone system as claimed in claim 1, wherein the main device further comprises:

means for monitoring a traffic table to which received traffic information is written in units of the wireless-LAN base station, at a predetermined time interval;

means for performing overload notification to a wireless telephone connected to an overloaded one of the wireless-LAN base stations when the received traffic information has exceeded a predetermined traffic value;

means for requesting a modification of an audio codec used in communication.

6. A telephone system as claimed in claim 1, wherein the main device further comprises:

means for dialing into a public network;

means for providing a gateway function for an IP-network communication and the public network;

means for dialing into a local-area analog network and a local-area PHS network in addition to the public network;

means for referencing the user information table when an unlogged-in wireless telephone has received data; and means for transmitting the received data to a telephone number of a predetermined transfer-destination public telephone network.

7. A telephone system as claimed in claim 6 wherein the main device further comprises:

means for referencing traffic information in a traffic table of the wireless-LAN base station into which a reception-destination wireless telephone is registered; and means that references the user information table and that transmits the received data to a local-area wireless telephone in a predetermined transfer-destination local network when the referenced traffic information has exceeded a predetermined amount of transmission/reception and a predetermined number of terminals.

8. A telephone system as claimed in claim 1, wherein the main device further comprises:

means for holding a call in a pending state for a predetermined time and means for recording an e-mail address into the user information table when an unlogged-in wireless telephone has received data;

means for transmitting e-mail having predetermined contents;

means for referencing the user information table and performing notification to perform prompting for data reception and a login operation; and means for releasing the pending state to enable communication when one of the wireless telephones has performed a login operation.

9. A telephone system as claimed in claim 6, wherein the main device further comprises:

a schedule table to which transfer destinations are written in units of a user for a predetermined time zone;

means for detecting a transfer destination corresponding to the schedule table according to the time when data has been received; and means for transmitting the received data to a corresponding transfer destination.

* * * * *